Sept. 26, 1961  J. G. BURNS  3,001,621
SHAFT DRIVER COUPLING
Filed Jan. 27, 1960
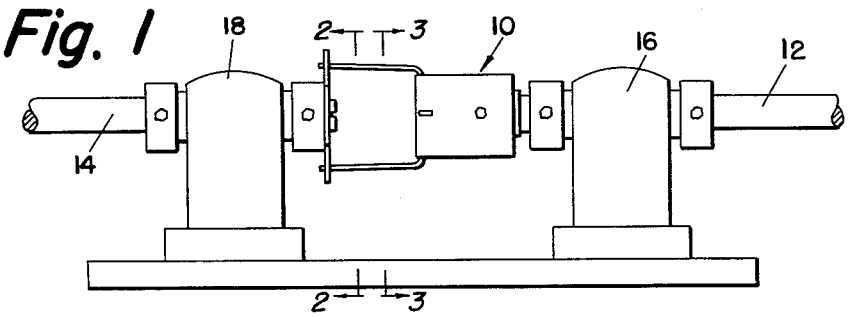
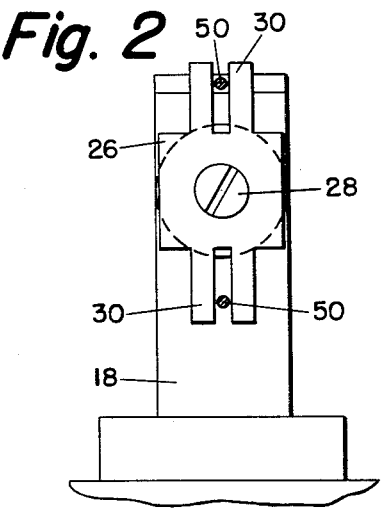
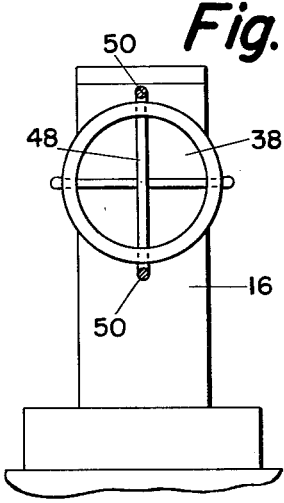
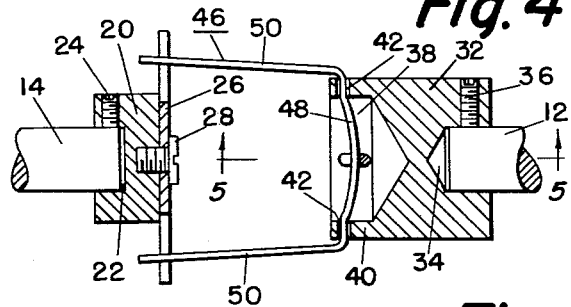
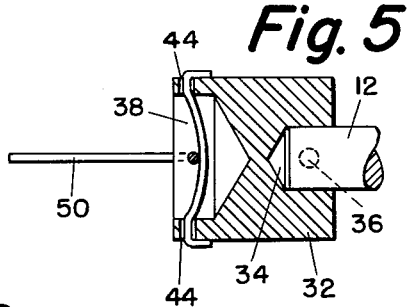
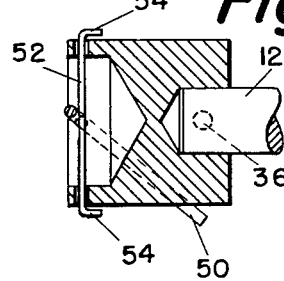
*INVENTOR.*
JEROME G. BURNS
BY *Donald S Cohen*
ATTORNEY

United States Patent Office 3,001,621
Patented Sept. 26, 1961

3,001,621
SHAFT DRIVE COUPLING
Jerome G. Burns, Media, Pa., assignor to International Resistance Company, Philadelphia, Pa.
Filed Jan. 27, 1960, Ser. No. 4,966
7 Claims. (Cl. 192—56)

The present invention relates to a shaft drive coupling, and more particularly to a torque limiting shaft drive coupling.

In many types of rotating shaft drive arrangements it is desirable to provide means for limiting the torque on the shafts to prevent damage to the shafts or the instrumentalities being driven. Although there are many types of clutches for achieving this purpose, such clutches are normally complicated in structure and relatively large in size. In addition, such clutches will not accommodate any misalignment, either angular or axial, between the shafts which are coupled by the clutch.

It is an object of the present invention to provide a novel shaft drive coupling.

It is another object of the present invention to provide a novel torque limiting shaft drive coupling.

It is still another object of the present invention to provide a coupling for a drive shaft which will become completely disconnected when the torque on the coupling reaches a predetermined amount, but which can be easily and quickly reconnected.

It is a further object of the present invention to provide a torque limiting shaft drive coupling which will accommodate both angular and axial misalignment between the shafts being coupled, but does not load the driven shaft with either an axial or radial force.

It is a still further object of the present invention to provide a torque limiting shaft drive coupling in which the maximum permissable torque can be adjusted.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevational view of the shaft drive coupling of the present invention.

FIGURE 2 is a sectional view taken along line 2—2 of FIGURE 1.

FIGURE 3 is a sectional view taken along line 3—3 of FIGURE 1.

FIGURE 4 is a transverse sectional view of the shaft drive coupling of the present invention.

FIGURE 5 is a sectional view taken along line 5—5 of FIGURE 4.

FIGURE 6 is a view similar to FIGURE 5 showing the coupling of the present invention in its disconnected disposition.

Referring initially to FIGURE 1, the shaft drive coupling of the present invention is generally designated as 10. The coupling 10 drivingly connects a pair of shafts 12 and 14 which are rotatably supported in bearings 16 and 18 respectively.

The shaft drive coupling 10 comprises a hub 20 mounted on the end of the shaft 14. The hub 20 has a recess 22 in one end, into which recess 22 the end of the shaft 14 fits. A setscrew 24 is threaded radially through the hub 20 and engages the shaft 14 to secure the hub 20 to the shaft 14. A plate 26 is mounted on the end of the hub 20 away from the shaft 14. The plate 26 is secured to the hub 20 by a screw 28 which extends through the center of the plate 26 and is threaded into the center of the end of the hub 20. The screw 28 secures the plate 26 to the hub 20 so that the plate 26 will rotate with the hub 20. The plate 26 has two pairs of arms 30 extending from opposite sides of the plate 26. The arms 30 of each pair are in spaced, parallel relation, and each pair of arms 30 extends substantially radially of the hub 20.

A cylindrical body 32 is mounted on the end of the shaft 12. The body 32 has a recess 34 in one end, which recess 34 receives the end of the shaft 12. A setscrew 36 is threaded radially through the body 32 and engages the shaft 32 to secure the body 32 to the shaft 12. The body 32 has a recess 38 in its end away from the shaft 12. The recess 38 provides the body 32 with a cylindrical wall 40. The wall 40 has a pair of diametrically aligned holes 42 therethrough (see FIGURE 4). The wall 40 also has a second pair of diametrically aligned holes 44 therethrough (see FIGURE 5), which holes 44 are spaced ninety degrees from the holes 42.

A U-shaped drive member 46 is mounted on the body 32. The base 48 of the drive member 46 extends diametrically across the recess 38 in the body 32, and extends through the diametrically aligned holes 42. The arms 50 of the drive member 46 extend from the ends of the base 48 juxtaposed to the outer surface of the body 32. Thus, the drive member 46 is pivotally supported in the holes 42 in the body 32. The base 48 of the drive member 46 has an arcuate center portion which is curved in the direction away from the direction that the arms 50 extend. The drive member 46 is made of a relatively stiff but resilient metal wire, such as a piano wire. The arms 50 of the drive member 46 are spaced apart a distance less than the distance between the ends of the pairs of arms 30 of the plate 26.

A spring 52 extends diametrically across the recess 38 in the body 32, and extends through the holes 44 in the wall 40 of the body 32. Spring 52 comprises a length of a relatively stiff but flexible wire, such as piano wire. As shown in FIGURE 6, the spring 52 in its relaxed condition is of a length greater than the outer diameter of the body 32. The spring 52 is provided with flanges 54 on its ends which secure the spring 52 to the body 32. The spring 52 extends across the base 48 of the drive member 46 behind the base 48. Thus, as shown in FIGURES 4 and 5, when the drive member 46 is pivoted so that the arms 50 extend substantially axially of the body 32, the arcuate portion of the base 48 engages and bends the spring 52 to place the spring 52 under tension. The spring 52 will then tend to pivot the drive member 46 to the position shown in FIGURE 6.

The operation of the shaft drive coupling 10 of the present invention is as follows:

The drive member 46 is pivoted so that the arms 50 extend substantially axially of and away from the body 32. The end of each of the arms 50 is inserted in the space between a pair of the arms 30 on the plate 26. The resiliency of the arms 50 permits the arms 50 to be spread apart so that the arms 50 can be easily inserted between the arms 30 of the plate 26. When one of the shafts, such as the shaft 12, is rotated, the arms 50 of the drive member 46 will engage the arms 30 of the plate 26, and thereby rotate the plate 26 to rotate the shaft 14. Thus, rotation of the shaft 12 rotates the shaft 14 through the drive coupling 10. Likewise, rotation of the shaft 14 will rotate the shaft 12.

Considering the shaft 12 as the drive shaft, and the shaft 14 as the driven shaft, if a torque is applied to the shaft 14 the shaft 14 will tend to slow down with respect to the shaft 12. Any slowing down of the shaft 14 with respect to the shaft 12 causes a bending of the arms 50 of the drive member 46. As the torque on the shaft 14 increases, the arms 50 of the drive member 46 will be bent more and more until the arms 50 snap out of the space between the arms 30 of the plate 26. When the arms 50 of the drive member 46 snap out of the spaces between the arms 30 of the plate 26, the drive member 46 is free so that the spring 52 will pivot the arms 50 away from the plate 26 to the position shown in FIGURE 6. Thus, the drive coupling 10 is disconnected so that the drive shaft 12 will continue to rotate without rotating the driven shaft 14.

Thus, the coupling 10 of the present invention will provide a drive between two rotating shafts, and will disconnect the drive when a predetermined torque is applied to the driven shaft. The size and stiffness of the wire of the drive member 46 will determine the minimum torque which will cause the coupling 10 to become disconnected. By adjusting the shafts 12 and 14 so that the adjacent ends of the shafts 12 and 14 are closer together, the arms 30 of the plate 26 will engage the arms 50 of the drive member 46 closer to the base 38 of the drive member 46, and thereby increase the torque required to disconnect the coupling 10. Thus, there is provided some adjustment in the maximum torque permitted by the coupling 10 of the present invention. When the coupling 10 of the present invention has become disconnected, it can be easily reconnected by merely pivoting the drive member 46 to a position with the arms 50 extending axially of the body 32, and then reinserting the arms 50 in the spaces between the arms 30 of the plate 26.

In a shaft driving arrangement, an undesired torque applied to the driven shaft may be caused by either a faulty or worn bearing, or by damage to the instrumentality being driven. By using the torque limiting shaft drive coupling 10 of the present invention, the drive is disconnected before the torque builds up enough to either damage the driving means, the shafts, or cause excess damage to the instrumentalities being driven. However, the drive coupling 10 of the present invention permits ease of reconnecting the drive when the cause of the torque is removed. In addition, since the drive member 46 is pivotable with respect to the body 32, the drive member 46 will permit a driving connection between the shafts 12 and 14 even if the shafts 12 and 14 are out of alignment, either axially or angularly.

The present invention may be embodied in other specific forms without departing from the spirit or essential attributes thereof and, accordingly, reference should be made to the appended claims, rather than to the foregoing specification as indicating the scope of the invention.

I claim:

1. A torque limiting shaft drive coupling comprising a pair of rotatable shafts mounted with the end of one of said shafts being adjacent an end of the other of said shafts, means on one of the shafts providing a pair of diametrically aligned slots extending radially of the shaft, a U-shaped drive member pivotally mounted on the end of the other shaft, said drive member being pivotally mounted for rotation about the axis of the base of the drive member with the base of the drive member extending diametrically of the other shaft, the arms of said drive member being of a stiff but resilient wire, each of the arms of the drive member being adapted to fit into a separate one of the slots provided on the one shaft, and spring means engaging the drive member to rotate the drive member when the arms of the drive member become free of the slots so as to pivot the arms away from the one shaft.

2. A torque limiting shaft drive coupling comprising a pair of rotatable shafts mounted with the end of one of said shafts being adjacent an end of the other of said shafts, means on one of the shafts providing a pair of diametrically aligned slots extending radially of the shaft, a body member mounted on the end of the other shaft, said body member having an axially extending recess in its end away from the shaft, said recess providing the body with a cylindrical wall, a pair of diametrically aligned holes through said wall, a U-shaped drive member of a relatively stiff but resilient wire having a base and a pair of arms, the base of the drive member extending diametrically across the recess in the body and through the holes, the arms of the drive member being juxtaposed to the outer surface of said body, said drive member being pivotal about the axis of the base and the arms being adapted to fit into a separate one of the slots provided on the one shaft, and spring means engaging the drive member to rotate the drive member when the arms of the drive member become free of the slots so as to pivot the arms away from the one shaft.

3. A shaft drive coupling in accordance with claim 2 in which the wall of the body has a second pair of diametrically aligned holes therethrough which are spaced from the first pair of holes, and the spring means comprises a stiff but resilient wire extending diametrically across the recess in the body behind the base of the drive member and projecting through said second pair of holes.

4. A shaft drive coupling in accordance with claim 3 in which the spring wire is of a length longer than the outer diameter of the body and the spring wire has flanges on its ends juxtaposed to the outer surface of the body.

5. A shaft coupling in accordance with claim 3 in which the base of the drive member has an arcuate center portion which is bent to extend in the direction opposite the direction that the arms extend, said arcuate portion of the base engaging and bending the spring wire when the drive member is pivoted to a position to permit the arms to be inserted in the slots provided on the other shaft.

6. A shaft coupling in accordance with claim 3 in which the means on the one shaft providing the slots comprises a plate secured to the end of the one shaft, two pairs of arms extending in opposite directions from said plate, the arms of each pair being spaced apart to provide the slots and the arms extending substantially radially of the one shaft.

7. A shaft coupling in accordance with claim 6 in which the plate is securd to the end of a hub, and the hub is mounted on the one shaft.

References Cited in the file of this patent

UNITED STATES PATENTS

| 2,903,112 | Foster et al. | Sept. 8, 1959 |
| 2,915,157 | Kueneman et al. | Dec. 1, 1959 |

FOREIGN PATENTS

| 497,609 | France | Sept. 18, 1919 |